Patented June 11, 1940

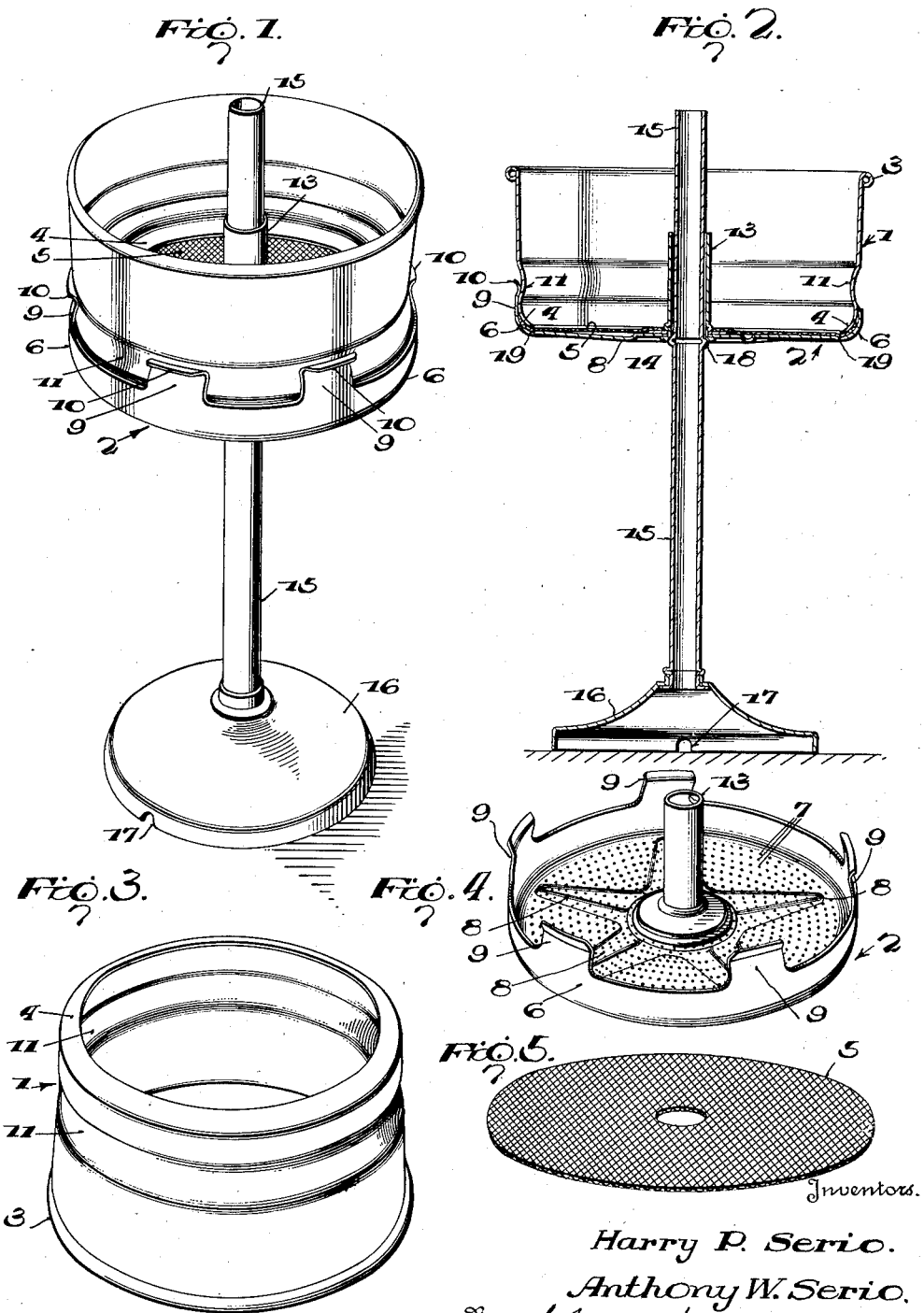

2,204,158

UNITED STATES PATENT OFFICE 2,204,158

PERCOLATOR STRAINER BASKET FOR COFFEEPOTS

Harry P. Serio and Anthony W. Serio, Elmira, N. Y.

Application June 3, 1938, Serial No. 211,672

4 Claims. (Cl. 53—3)

The invention relates to a percolator strainer basket for coffeepots or containers.

The object of the present invention is to provide for coffeepots a simple, practical, and comparatively inexpensive percolator and strainer basket of strong and durable construction designed to be mounted on the tubular stem of a percolator member and adapted for making either percolated, filtered or drip coffee and capable of securely clamping a filter element of fabric or other material detachably in place upon the bottom of the device and of effectually preventing the filter element from becoming displaced by the boiling of liquid within the coffeepot or container.

A further object of the invention is to provide for holding the ground coffee, a percolator strainer basket comprising two separable detachably interlocked sections adapted when assembled to clamp securely a fabric or other filter element in position upon the bottom of the container and capable of enabling the filter element to be readily removed by separating the detachably interlocked sections or members of the percolator strainer basket whereby the device, after the making of coffee, may be readily and thoroughly cleaned and maintained in a perfectly sanitary condition.

With the above and other objects in view, the invention consists in the construction and novel combination and arrangement of parts hereinafter fully described, illustrated in the accompanying drawing and pointed out in the claims hereto appended, it being understood that various changes in the form, proportions and minor details of construction, within the scope of the claims, may be resorted to without departing from the spirit or sacrificing any of the advantages of the invention.

In the drawing:

Figure 1 is a perspective view of a percolator strainer basket constructed in accordance with this invention and shown mounted on the hollow of a percolator member.

Figure 2 is a central vertical sectional view of the same.

Figure 3 is an inverted detail perspective view of the body portion of the percolator strainer basket.

Figure 4 is a detail perspective view of the bottom of the percolator strainer basket, the filter element being removed.

Figure 5 is a detail view of the filter element.

The percolator strainer basket comprises in its construction a substantially cylindrical body portion 1 and a circular bottom 2, but the form of the percolator strainer basket may, of course, be varied as will be readily understood. The cylindrical body portion 1 is preferably provided at its upper edge with a bead 3, and it has its lower marginal portion curved downwardly and inwardly forming an annular flange 4, which, when the parts of the percolator strainer basket are assembled, is adapted to clamp a filter element 5 upon the bottom 2 of the basket. The flange 4 presents a lower slightly inclined convex annular surface to the upper face of the fabric element 5, and the bottom 2 is provided with a marginal rim 6 of annular formation curved in cross section and presenting a concave upper face to the marginal portion of the fabric filter element, which is firmly clamped between the rim portion 6 of the bottom 2 and the bottom flange 4 of the body portion of the percolator strainer basket.

The bottom 2 of the percolator strainer basket is provided with perforations 7, and it has radial depressions 8 forming a substantially star-shaped figure and adapted to facilitate the filtering of the coffee through the bottom of the percolator strainer basket.

The circular bottom 2 of the percolator strainer basket is provided at its rim 6 with upwardly extending resilient tongues 9 inclined slightly inwardly and having their upper edges 10 bent outwardly slightly to facilitate the introduction of the cylindrical body portion within the space defined by the upwardly extending prongs. The upwardly extending resilient prongs are adapted to clamp the body portion of the percolator strainer basket to the bottom and the body portion 1 is provided adjacent the flange 4 with an annular constricted portion 11 providing a slight exterior annular depression or groove into which the prongs fit, whereby the body portion is securely clasped by the prongs and the parts of the percolator strainer basket maintained in their assembled relation and in engagement with the removable filter element.

While the resilient prongs are shown as the means for detachably interlocking the sections or members of the percolator strainer basket, it will be clear that any equivalent means may be provided for holding these parts in their assembled relation.

The bottom of the percolator strainer basket is provided with a central upwardly extending sleeve 13 suitably secured at its lower end within a central opening 14 of the bottom 2, which is adapted to be supported upon the upper portion of the tubular stem 15 of a percolator member comprising the hollow stem and a substantially dome-shaped base 16, which in practice is arranged in the usual manner upon the bottom of the coffeepot or container and which is provided with recesses or notches 17 to permit the passage of liquid from the exterior of the dome to the interior of the same.

The hollow stem 15 is provided with an exterior annular shoulder 18 forming a supporting abutment for the bottom of the percolator strainer basket which is removably seated upon the said abutment 18.

When the parts are assembled and the percolator strainer basket with its filter element is arranged upon the hollow stem of the percolator member, the assembled percolator member and percolator strainer basket are placed within a coffeepot or container in the usual manner, and it is then adapted for the making of either percolated coffee or drip coffee, as will be readily understood. The curved rim of the bottom of the basket forms an annular groove 19 in the upper face of the bottom of the basket to receive the marginal portion of the filter element.

What is claimed is:

1. A percolator strainer basket adapted to be mounted on a hollow stem of a percolator member and comprising a body portion open at both ends, a filter element, and a separate perforated bottom, said body portion and bottom having coacting means for detachably securing the bottom across the lower open end of the body portion and being provided with coacting clamping portions for securing the filter element upon the perforated bottom, said bottom of the percolator strainer basket having a central upright hollow stem for disposal on a percolator tube and having means to hold portions of said filter element against flatwise contact therewith.

2. A percolator strainer basket comprising a bottom having apertures for the passage of a liquid and provided with an upwardly extending rim having resilient upwardly extending tongues, said rim forming a groove adapted to receive the marginal portion of a filter element when the same is arranged upon the bottom of the percolator strainer basket, and a body portion arranged upon the bottom of the percolator strainer basket and provided at its lower edge with a flange arranged to clamp the filter element upon the bottom, said body portion having its lower end within the rim of the bottom and being constricted above the bottom for external engagement by said prongs to provide a secure interlocking connection between the body portion and the bottom portion of the basket.

3. A strainer basket for that type of percolator element including an upstanding percolator tube, said basket including a body portion open at both ends, a separate perforated bottom having a central tubular stem for telescoping the percolator tube and having clamping elements upstanding around and engaging the body portion to form the sole connection between the body portion of the basket and said tubular stem, a flexible filter element overlying the perforated bottom, said body portion and said bottom having imperforate flanged portions curved in interfitting relation and fitting clamping surfaces for engaging and clamping the marginal portion of said filter element to hold the latter across the upper surface of the bottom.

4. A strainer basket for that type of percolator element including an upstanding percolator tube, said basket including a body portion open at both ends, a separate perforated bottom having a central upstanding tubular stem for telescoping the percolator tube, and having clamping elements upstanding around and engaging the body portion to form the sole connection between the body portion of the basket and said tubular stem, and a flexible filter element of greater diameter than the body portion, having a central opening to surround said tubular stem of the bottom, said body portion and said bottom having flanged portions forming interfitting clamping surfaces for engaging and clamping the marginal portion of said filter element to hold the latter across the upper surface of the bottom, and said bottom having means engaging and holding portions of the said flexible filter element against flatwise contact therewith.

HARRY P. SERIO.
ANTHONY W. SERIO.

CERTIFICATE OF CORRECTION.

Patent No. 2,204,158. June 11, 1940.

HARRY P. SERIO, ET AL.

It is hereby certified that error appears in the printed specification of the above numbered patent requiring correction as follows: Page 2, second column, line 22, claim 3, for the word "fitting" read --forming--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.